Patented Sept. 18, 1945

2,384,811

UNITED STATES PATENT OFFICE 2,384,811

INSECTICIDAL AMIDES

Gerald H. Coleman, Wesley D. Schroeder, and Gerald A. Griess, Midland, Mich., assignors to The Dow Chemical Company, Midland, Mich., a corporation of Michigan No Drawing. Application June 15, 1942,
Serial No. 447,144

6 Claims. (Cl. 260—562)

The present invention relates to amides and to compositions in which they are employed as insecticidal toxicants.

We have prepared representative members of this group of compounds and found them to be viscous, water-like oils or low-melting solids, insoluble in water and relatively soluble in many common organic solvents. The compounds with which the invention is particularly concerned are those having the following formula

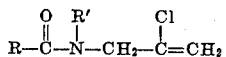

wherein R and R' each represents a hydrocarbon radical selected from the group consisting of alkyl, cycloalkyl, aryl, aralkyl, and alkenyl. A preferred group of compounds falling within the scope of the invention are those having the formula

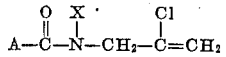

wherein A represents an aliphatic radical and X represents a hydrocarbon ring structure comprising 6 carbon atoms, e. g. phenyl and cyclohexyl.

The new compounds may be prepared by reacting a secondary 2-chloroallyl amine with an organic acid, acid anhydride, or acid chloride. In such preparation, an organic reaction solvent such as toluene, benzene, xylene, etc. may be employed if desired. Equimolecular amounts of reactants have been found to give satisfactory yields of the desired amides. Where an acid chloride is employed, it is advantageous to include a small amount of pyridine or other alkaline reacting material in the reaction mixture. When operating with a free acid, a condensing agent such as phosphorous trichloride is desirable. In preparations involving such low-boiling reactants as acetic anhydride, an excess of the latter may serve as the reaction solvent. Such practice permits the removal of water of reaction by distilling off the acetic acid as formed.

The reaction is preferably carried out at a temperature between about 40° C. and the boiling or decomposition temperature of the mixture. A convenient method of operation comprises mixing the reactants together at relatively low temperatures and thereafter heating the mixture to its boiling temperature and under reflux to complete the reaction. When the reaction is completed, the mixture may be treated with dilute aqueous sodium carbonate or other alkaline reacting material to neutralize traces of unreacted acid or acid products formed during the reaction. The crude product is then separated by extraction or decantation, washed with water, and fractionally distilled or crystallized to obtain the desired amide derivatives.

The following examples illustrate the invention but are not to be construed as limiting the same.

Example 1

34.7 grams (0.2 mol) of N-(2-chloroallyl)-cyclohexylamine, 17.2 grams (0.2 mol) · of crotonic acid, and 125 grams of toluene were mixed together and heated to 50° C. with stirring, 13.7 grams (0.1 mol) of phosphorous trichloride was added to the reaction mixture portionwise and with stirring over a period of one hour with the temperature at 50°–55° C. The reaction mixture was then heated to its boiling temperature and under reflux for 8 hours, and thereafter mixed with 200 milliliters of water and neutralized with aqueous sodium carbonate. The toluene layer was separated, washed with water, and the toluene recovered by distillation at atmospheric pressure. The residue from this preliminary distillation was fractionally distilled under reduced pressure whereby there was obtained 37 grams of N-(2-chloroallyl)-N-cyclohexyl-crotonamide as a colorless liquid, boiling at 131°–135° C. at 1.5 mm. pressure, and having the specific gravity of 1.084 at 25°/25° C. This compound was relatively insoluble in water and somewhat soluble in alcohol, carbon tetrachloride, and kerosene.

Example 2

In a similar manner 50.3 grams (0.3 mol) of N-(2-chloroallyl)-aniline and 31.4 grams (0.3 mol) of crotonyl chloride were reacted together. In this preparation the N-(2-chloroallyl)-aniline and 35 cc. of pyridine were dissolved in 125 milliliters of benzene and the crotonyl chloride added portionwise thereto over a period of 1 hour. The reaction mixture was then heated on a steam bath for 16 hours. The resultant crude amide product was recovered by decantation and fractionally distilled. As a major product of reaction, there was obtained 24 grams of N-(2-chloroallyl)-N-phenyl-crotonamide as a thick, viscous liquid, boiling at 145°–149° C. at 3 mm. pressure and having a specific gravity of 1.33 at 25°/25° C. This compound is relatively insoluble in water and somewhat soluble in carbon tetrachloride, 95 per cent ethanol, and kerosene.

In a similar fashion other amide compounds were prepared of which the following are representative:

N-(2-chloroallyl) - N - cyclohexyl - benzamide from N-(2-chloroallyl)-cyclohexylamine and benzoyl chloride. This compound melts at 63°-64° C. when crystallized out of cyclohexane It is relatively insoluble in water and somewhat soluble in kerosene, carbon tetrachloride, and ethanol.

N-(2-chloroallyl)-N-phenyl-benzamide from N-(2-chloroallyl)-aniline and benzoyl chloride. This compound is a white crystalline solid melting at 65°-67° C. relatively insoluble in water, somewhat soluble in kerosene, and very soluble in carbon tetrachloride and ethanol.

N-(2-chloroallyl)-N-phenyl-acetamide from N-(2-chloroallyl)-aniline and acetic anhydride. This compound is a water-white liquid, boiling at 124°-126° C. at 10 mm. pressure, and having a density of 1.151 grams per cubic centimeter at 25° C. The compound is relatively insoluble in water, soluble to the extent of 3 per cent or more in kerosene, and relatively soluble in carbon tetrachloride, and 95 per cent ethanol.

N - (2-chloroallyl) - N - cyclohexyl - acetamide from N-(2-chloroallyl)-cyclohexylamine and acetic anhydride. This compound is a mobile liquid, boiling at 119° C. and having a density of 1.089 grams per cubic centimeter at 25° C. The compound is relatively insoluble in water and very soluble in kerosene, carbon tetrachloride, and 95 per cent ethanol.

N-(2-chloroallyl)-N-phenyl-caproamide from N-(2-chloroallyl)-aniline and caproyl chloride. This compound boils at 127°-130° C. at 1 mm. pressure and has a density of 1.067 at 25°/25° C. It is relatively insoluble in water and soluble in 95 per cent ethanol, carbon tetrachloride, and kerosene.

The compounds as described above have definite insecticidal properties and may be employed as the active toxicant in insecticidal spray and dust compositions. In such compositions the new amides may be dissolved in suitable non-corrosive organic solvents, emulsified with water and suitable wetting and dispersing agents, or dispersed in and on finely divided solid carriers such as diatomaceous earth, bentonite, talc, wood flour, etc. The action of the toxicants is principally that of a contact poison, although, in certain instances a tendency to act as a stomach poison is also evident.

In representative compositions, the amides are dissolved in light petroleum distillates or kerosene to obtain fly spray compositions. The following table illustrates the results obtained when operating in this fashion against 3 to 5 day old houseflies according to the well known Peet-Grady method.

Table

| Compound | Per cent knockin 10 mins. | Per cent kill in 24 hours |
| --- | --- | --- |
| N-(2-chloroallyl)-N-phenylbenzamide | 90 | 36 |
| N-(2-chloroallyl)-N-cyclohexylacetamide | 95 | 30 |
| N-(2-chloroallyl)-N-cyclohexylbenzamide | 93 | 36 |
| N-(2-chloroallyl)-N-phenylacetamide | 100 | 41.6 |
| N-(2-chloroallyl)-N-cyclohexylcrotonamide | 97.8 | 28.2 |
| N-(2-chloroallyl)-N-phenylcrotonamide | 98.8 | 40.2 |
| N-(2-chloroallyl)-N-phenolcaproamide | 97 | 43 |

The knockdowns obtained in the foregoing determinations were particularly impressive.

If desired, the foregoing compositions may be employed in combination with pyrethrin- or rotenone-containing extracts or with other organic and inorganic insecticidal toxicants. Other insect and mite pests which may be controlled with compositions comprising the new amide products are red spider, aphis, mosquito, cockroach, thrips, etc.

While the foregoing examples have been directed to N-cyclohexyl and N-phenyl-(2-chloroallyl) amides of acetic, benzoic, crotonic, and caproic acids, it is to be understood that other reactants may be substituted for those shown to obtain N-butyl, N-octyl, N-benzyl, N-beta-phenyl-ethyl, N-tolyl, N-allyl, and N-methyl-cyclohexyl-(2-chloroallyl) amides of cyclohexanoic acid, phenylacetic acid, stearic acid, hexanoic acid, oleic acid, cresotinic acid, 4-tertiarybutyl-phenylacetic acid, alpha-naphthylacetic acid, etc.

We claim:

1. An amide having the formula

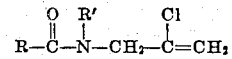

wherein R and R' each represents a hydrocarbon radical selected from the group consisting of alkyl, cycloalkyl, aryl, aralkyl, and alkenyl.

2. An amide having the formula

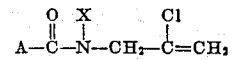

wherein A represent an aliphatic hydrocarbon radical and X represents a hydrocarbon radical containing a ring structure composed of 6 carbon atoms.

3. An amide having the formula

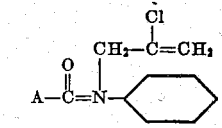

wherein A represents an aliphatic hydrocarbon radical.

4. N-(2-chloroallyl)-N-phenyl-crotonamide.
5. N-(2-chloroallyl)-N-phenyl-acetamide.
6. N-(2-chloroallyl)-N-phenyl-caproamide

GERALD H. COLEMAN.
WESLEY D. SCHROEDER.
GERALD A. GRIESS.